United States Patent [19]
Arbabi et al.

[11] Patent Number: 5,461,699
[45] Date of Patent: Oct. 24, 1995

[54] FORECASTING USING A NEURAL NETWORK AND A STATISTICAL FORECAST

[75] Inventors: Mansur Arbabi, Bethesda; Scott M. Fischthal, Gaithersburg, both of Md.

[73] Assignee: International Business Machines Corporation, Armonk, N.Y.

[21] Appl. No.: 142,853

[22] Filed: Oct. 25, 1993

[51] Int. Cl.$^6$ .................................................. G06F 15/18
[52] U.S. Cl. ............................... 395/23; 395/22; 395/24; 364/401
[58] Field of Search ............................. 395/21, 22, 23, 395/24, 61; 364/401–407

[56] References Cited

U.S. PATENT DOCUMENTS

| | | | |
|---|---|---|---|
| 5,005,143 | 4/1991 | Altachuler et al. | 364/554 |
| 5,050,096 | 9/1991 | Serdman | 395/22 |
| 5,113,483 | 5/1992 | Keeler et al. | 395/23 |
| 5,140,537 | 8/1992 | Tullis | 364/578 |
| 5,142,612 | 8/1992 | Skeirik | 395/11 |
| 5,145,112 | 9/1992 | Ueda | 395/61 |
| 5,148,370 | 9/1992 | Litt et al. | 364/468 |
| 5,155,763 | 10/1992 | Bigus et al. | 379/113 |
| 5,155,801 | 10/1992 | Lincoln | 375/22 |
| 5,182,793 | 1/1993 | Alexander et al. | 395/13 |
| 5,218,646 | 6/1993 | Sirat et al. | 382/14 |

OTHER PUBLICATIONS

Forecasting of Electricity Comsumption Liu et al. IEEE 18–21, Nov. 1991.
Stock Market prediction system with Modular Neural Networks Kimoto et al., IEEE/ 17–21 Jun. 1990.
Weather Sensitive Short–term Load Forecasting Virus Naturally Connected Artificial Neural Network Chen et al., IEEE Aug. 1992.
"Artificial Nueral Networks Weighting the Different Ways to Systematize Thinking", Moore, IEEE Potentials Feb. 1992.
"Neural Networks at Work", Hammerstrum, IEEE Spectrum, Jun. 1993.
"Neurocomputing: picking the Human Brain", Hecht–Nielsen IEEE Spectrum Mar. 1989.
"Nueral Network Primer" Parts I–V, Caudill, AI Expert Dec. 1987, Feb. 1988, Jun. 1988, Aug. 1988.
"Pattern Recognition: Neural Networks in Perspective", Klang, IEEEE Expert, Aug. 1993.
"Learning Internal Representaions by Error Propagation" Rumelhart et al. 1988.

*Primary Examiner*—Allen R. MacDonald
*Assistant Examiner*—Richemond Dorvil
*Attorney, Agent, or Firm*—John D. Flynn; Ronald L. Drumheller

[57] ABSTRACT

A system and method for forecasting that combines a neural network with a statistical forecast is presented. A neural network having an input layer, a hidden layer, and an output layer with each layer having one or more nodes is presented. Each node in the input layer is connected to each node in the hidden layer and each node in the hidden layer is connected to each node in the output layer. Each connection between nodes has an associated weight. One node in the input layer is connected to a statistical forecast that is produced by a statistical model. All other nodes in the input layer are connected to a different historical datum from the set of historical data. The neural network being operative by outputting a forecast, the output of the output layer nodes, when presented with input data. The weights associated with the connections of the neural network are first adjusted by a training device. The training device applies a plurality of training sets to the neural network, each training set consisting of historical data, an associated statistical output and a desired forecast, with each set of training data the training device determines a difference between the forecast produced by the neural network given the training data and the desired forecast, the training device then adjusts the weights of the neural network based on the difference.

9 Claims, 10 Drawing Sheets

BT9-93-017

FORECASTING USING A NEURAL NETWORK AND A STATISTICAL FORECAST

BACKGROUND OF THE INVENTION

1. Field of the Invention

The present invention relates to a system and method for the generation of forecasts. In particular the invention combines a neural network with a statistical model to produce more accurate forecasts.

2. Description of the Prior Art

Any organization, whether commercial, charitable, not for profit, or governmental, needs to plan its future activities. Planning necessarily requires estimation of future needs and demands. Thus, forecasting plays an important role in the planning process of any organization. The ability to accurately forecast or predict future conditions and needs is critical to the survival of many organizations. These organizations rely on forecasts so that they can allocate resources efficiently, balance workload against the forecasted demand and plan their operations to met needs and demands that will be placed upon them.

Most organizations require forecasts of volumes which are affected by historical trends over a wide variety of variables. Any entitlement program, service organization or sales force faces requirements for workload balancing based on projections of the number of customers or the volume of orders. These kinds of forecasts typically are dependent on trends in customer behavior. For instance, the United States Internal Revenue Service (IRS) plans the level of customer service at each geographical district office as many as five years in advance. The IRS provides services such as answering taxpayer questions, disseminating tax forms and providing publications and instructions for IRS representatives. To provide quality service, the IRS plans the utilization of resources. These resources include office space, conference areas, telephones, computers, personnel or other resources. Analysis of historical data shows that these services directly relate to the number of forms returned by taxpayers. For example, the level of service required for Form 1040 in a district office is related to the number of forms returned by the geographical region it serves. This relationship between service and return volume implies that the ability to forecast the volume of returns for specific forms can improve the accuracy of planning for services to be provided.

There are typically many factors affecting any one forecast. However, existing methods for solving this class of problems can only utilize a limited subset of the relevant factors.

There is a long-felt need in the art for producing accurate forecasts that utilize all applicable factors. There is also a long-felt need to produce forecasts that can be explained.

SUMMARY OF THE INVENTION

The above-mentioned long-felt need has been met in accordance with the present invention combining statistical forecasts with a neural network to generate a more accurate forecast. Such a system can handle a more robust set of factors and historical data.

It is an object of the invention to permit more efficient planning of resources in an organization by improving the accuracy of forecasts needed for planning purposes.

It is a still a further object to provide more accurate forecasts.

It is yet another object of the invention to produce more accurate forecasts by taking into consideration a larger number of factors.

It is a still further object of the invention to produce forecasts that are easy to explain and interpret.

In accordance with a preferred embodiment of the present invention, a system for generating a forecast, the forecasting system comprising a statistical means for producing a statistical forecast from a first set of historical data, a neural network having an input layer, a hidden layer, and an output layer, each layer having one or more nodes, a first node in the input layer connected to the statistical forecast, and all other nodes in the input layer connected to a different historical datum from the set of historical data, with each node in the input layer connected to each node in the hidden layer and each node in the hidden layer connected to each node in the output layer, the output layer outputting a forecast; Each connection between nodes has an associated weight and a training means for determining the weights for each of the connections of the neural network; where in the trained neural network is responsive to a statistical forecast generated from the statistical regression means and a second set of historical data for outputting a forecast.

The training means applies a plurality of training sets to the neural network, each training set consisting of historical data, an associated statistical output and a desired forecast, with each set of training data the training means determines a difference between the forecast produced by the neural network and the desired forecast, the training means then adjusts the weights of the neural network based on the difference. The error assigned to each node in the network may be assigned by the training means via the use of back propagation.

BRIEF DESCRIPTION OF THE DRAWINGS

The foregoing and other objects, aspects and advantages of the invention will be better understood from the following detailed description with reference to the drawings, in which.

DETAILED DESCRIPTION OF THE INVENTION

DEFINITIONS

"Node" a single neuron-like computational element in a neural network.

"Weight" an adjustable value or parameter with a connection between nodes in a network. The magnitude of the weight determines the intensity of the connection. Negative weights inhibit node firing while positive weights enable node firing.

"Connection" are pathways between nodes, that correspond to the axons and synapses of neurons in the human brain, that connect the nodes into a network.

"Learning Law" an equation that modifies all or some of the weights in a node's local memory in response to input signals and the values supplied by the activation function. The equation enables the neural network to adapt itself to examples of what it should be doing and to organize information within itself and thereby learn. Learning laws for weight adjustment can be described as supervised learning or unsupervised learning or reinforcement learning. Supervised learning assumes that the desired output of the node is known or can be determined from an overall error. This is then used to form an error signal which is used to update the weights. In unsupervised learning the desired output is not known and learning is based on input/output values. In reinforcement learning the weights associated with a node are not changed in proportion to the output error associated with a particular node but instead are changed in proportion to some type of global reinforcement signal.

"Activation function" or "Transfer function" a formula that determines a node's output signal as a function of the most recent input signals and the weights in local memory.

"Back propagation" in a neural network is the supervised learning method in which an output error signal is fed back through the network, altering connection weights so as to minimize that error.

"Input layer" the layer of nodes that forms a passive conduit for entering a neural network.

"Hidden layer" a layer of nodes not directly connected to a neural network's input or output.

"Output layer" a layer of nodes that produce the neural network's results.

OVERVIEW

Figure 1:
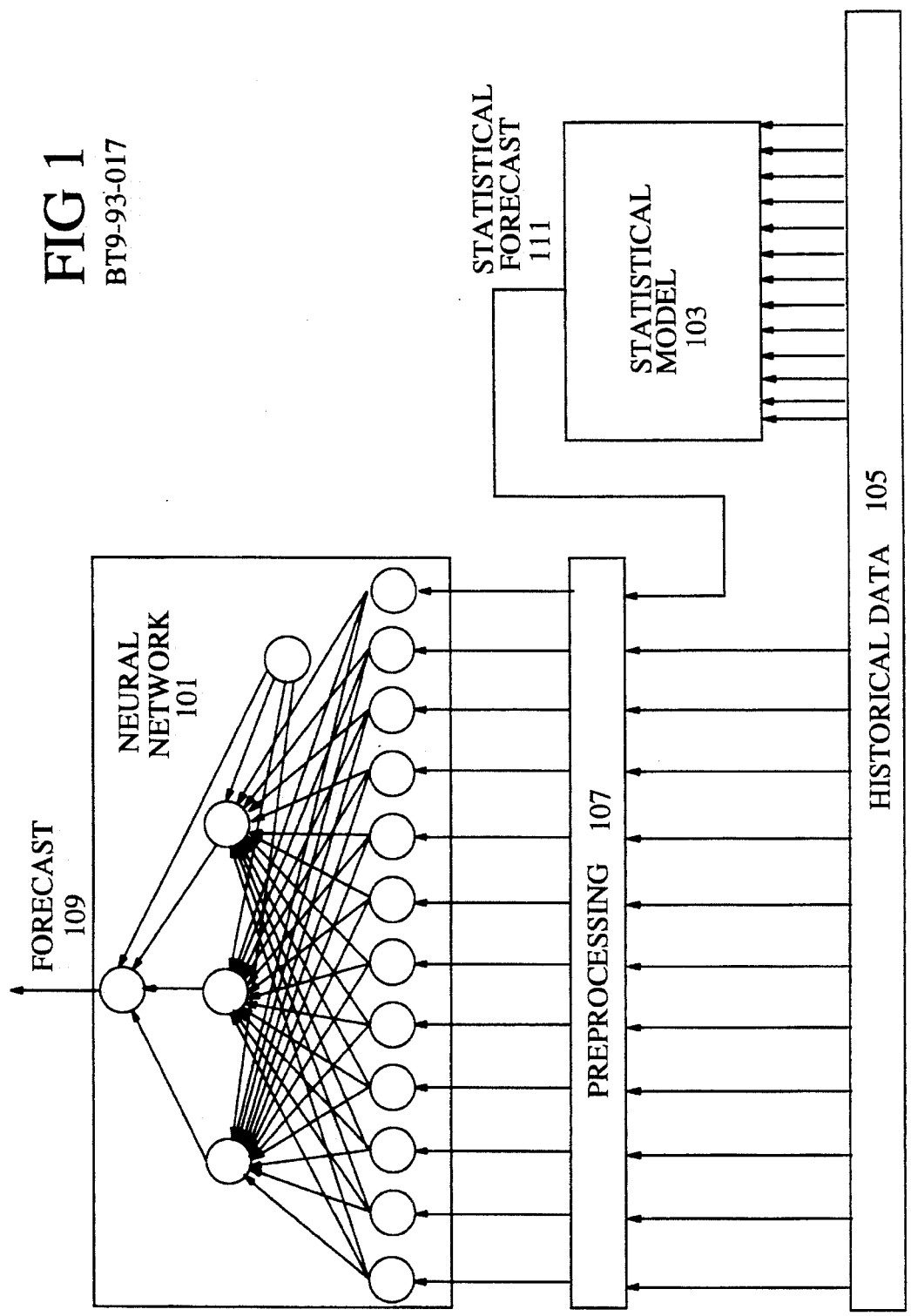
FIG. 1 is a functional overview of the present invention.

The present invention is a neural network system and method for generating a forecast. FIG. 1 shows a neural network 101, statistical model 103, historical data 105 and preprocessing unit 107. The neural network 101 generates a forecast from input data applied to its input layer. The inputs to the neural network consist of historical data and a statistical forecast. Assuming a forecasting system for projecting sales for the upcoming year the historical data may consist of any number of factors or variables (i.e., previous year sales, previous years sales force size, previous years information requests) with any number of measurements or metrics or items (i.e., previous year sales for 1992, 1991, 1990 and 1989). Data input to the neural network may be preprocessed by the preprocessing means 107 as shown in FIG. 1. Preprocessing can be used to normalize and recluster the input data.

The statistical forecast 111 input is generated from a statistical model. The statistical model may utilize a regression technique or any other statistical technique. The statistical forecast 111 represents the statistical model's 103 predication or forecast given the historical data 105. The historical data input to the statistical model may consist of the same input that the neural network is given but, it may also use different factors and different measurements.

The neural network 101 operates in three basic modes: training, operation and retraining. During training the neural network is trained by use of a training means that presents the neural network with sets of training data. The training sets consist of historical data, a statistical forecast and a desired output (i.e, actual, known, or correct output). The neural network generates a forecast based on the historical data and the statistical forecast in the training set. This forecast is then compared with the desired output. The difference between the forecast generated by the neural network and the correct output is used to adjust the neural network. During training the neural network learns and adapts to the inputs presented to it. After the neural network is trained it is utilized to make a forecast. This mode of operation is called operational mode. After the operational mode the neural network may be retrained with data collected from the current or other years. Thus, the neural network making a prediction of sales for 1994, may be trained with historical data from years preceding 1994 (i.e, trained using data from 1992 and other previous years, having the 1993 data as the desired output). The trained neural network can then be used to make a forecast for 1994 making use of the 1993 data as input along with data from preceding years. When the actual results for 1994 become known they can be added to the historical data 105 and the neural network can be retrained with data from 1993 using 1994 data as the desired output.

Advantages of combining the Statistical forecast with a Neural Net

By combining the statistical forecast in training and retraining as well as operations mode of the neural net, the present invention combines the benefits of both statistical means and a neural network. A statistical regression model predicts values within the range of experimental data. Regression methods often assume linearity and typically assume there is no interaction of categorical data values. Neural networks may produce better predictions due to inherent nonlinearity and potential for variable interaction.

An appropriate statistical model must be specified by the statistical analyst before using regressions and discriminant analysis to perform any numerical computation on the historical data. An approach using neural networks is more general. With a neural network there is no need to specify a model ahead of time. The neural network effectively discovers the appropriate model that suits the data by training.

One advantage the statistical approach has over neural networks is that it is more explicit and thus easier to interpret its results. Statistical models require assumptions about the underlying distribution of data not necessarily required by neural networks. Neural nets are more robust and generalize better when underlying processes are nonlinear and distributions are strongly non-Gaussian. Another advantage that neural networks have over the statistical approach is that they can be made to adapt when more data becomes available. Unlike statistical methods that require a new model be constructed, a neural network can be retrained with the new data thus adapting to the new data.

Statistical methods have tests of significance for input variables and confidence intervals for output variables. Comparable tests are not generally available for neural networks. A summary of the differences between neural networks and statistical models is shown in table I. By combining statistical forecast with a neural net the present invention acquires the beneficial characteristics of each.

TABLE I

| CHARACT-ERISTIC | NEURAL NETWORKS | STATISTICAL MODELING |
|---|---|---|
| Function Limitations | Any function (Kolomogorov's Theorem) | Often linear relationship between variables assumed |
| Data Interaction | All interactions allowed | No interaction between data values assumed |
| Model Specification | Underlying model generated as part of network training | Underlying model must be specified (nonlinear and linear methods) |
| Distribution | Distribution-free | Distribution of data is usually assumed |
| Adaptiveness | Can be adaptive | Fixed model |
| Significance Tests | No such tests available | Significance tests for input, confidence intervals for forecasted values |
| Ability to Handle Noisy Data | Robust enough to handle noisy or incomplete data | Difficult ot handle noisy or incomplete data |

DETAILED DESCRIPTION OF THE ELEMENTS

Neural Network

In order to appreciate the various aspects and benefits produced by the present invention a good understanding of neural network technology is required. For this reason the following section discusses neural network technology as applicable to the neural network of the present invention.

Artificial or computer neural networks are computer simulations of a network of interconnected neurons. A biological example of the of interconnected neurons is the human brain. It should be understood that the analogy to the human brain is important and useful in understanding the present invention. However, the neural networks of the present invention are computer simulations which provide useful forecasted or predicted values based on input data provided at specified intervals.

A neural network can be defined by three elements: a set of nodes, a specific topology of weighted interconnections between the nodes and a learning law which provides for updating the connection weights. Essentially a neural network is a hierarchical collection of nodes (also know as neurons or nuerodes or elements or processing elements or preceptrons), each of which computes the results of an equation (transfer or activation function). The equation may include a threshold. Each node's activation function uses multiple input values but produces only one output value. The outputs of the nodes in a lower level (that is closer to the input data) can be provided as inputs to the nodes of the next highest layer. The highest layer produces the output(s). A neural network where all the outputs of a lower layer connect to all nodes in the next highest layer is commonly referred to as a feed forward neural network.

Figure 4:
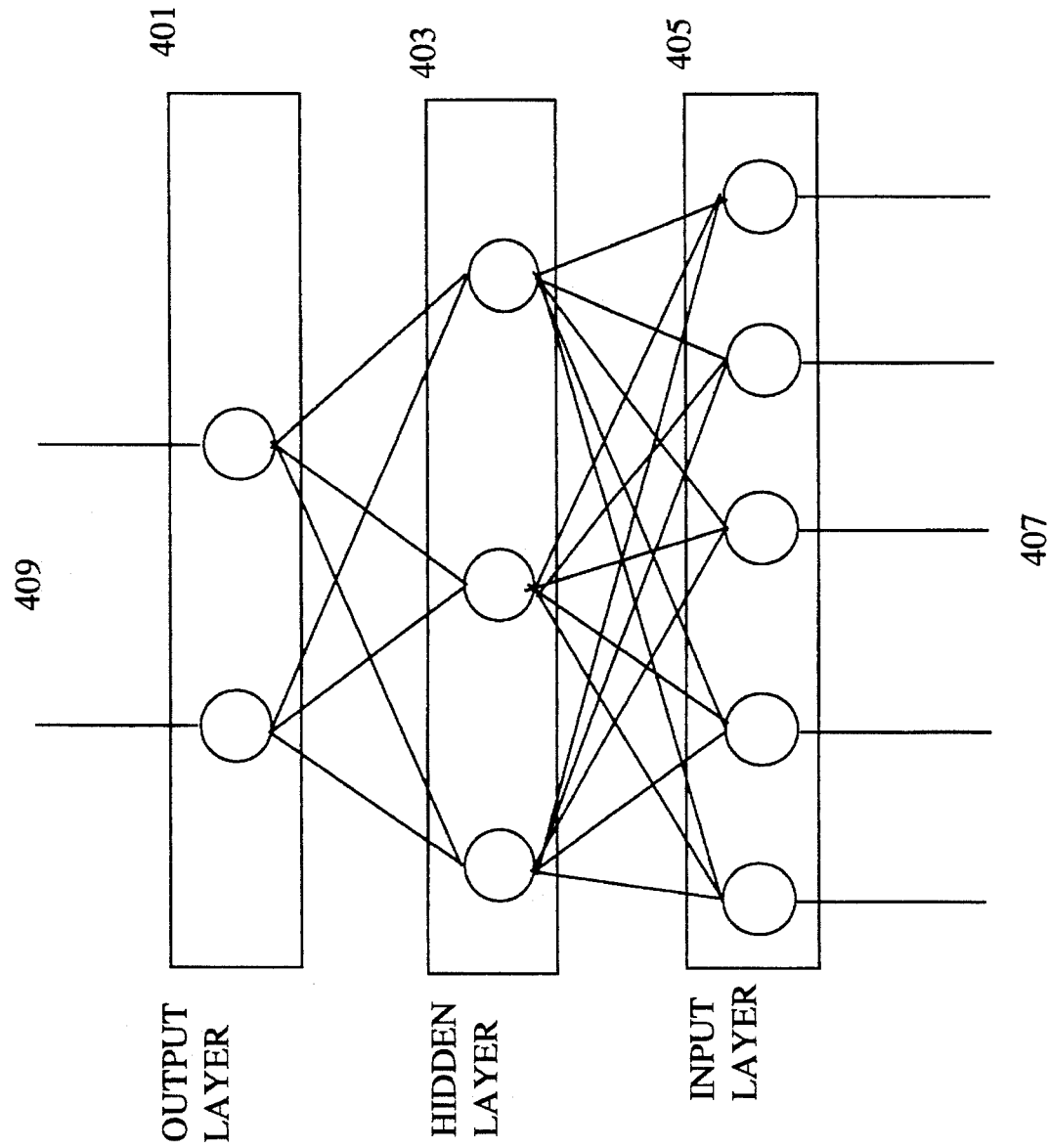
FIG. 4 shows a neural network with an input layer, a hidden layer and an output layer.

Referring now to FIG. 4, a representative example of a neural network is shown. It should be noted that the example shown in FIG. 4 is merely illustrative of one embodiment of a neural network. As discussed below, other embodiments of a neural network can be used. The embodiment of FIG. 4 has an input layer 405, a hidden layer (or middle layer) 403 and a output layer 401. The input layer 405 includes a layer of input nodes which take their input values 407 from the external input (historical data 105 and statistical forecast 111). The input data is used by the neural network to generate the output 409 (or forecast 109). Even though the input layer 405 is referred to as a layer of the neural network, the input layer 405 does not contain any processing nodes; instead it is a set of storage locations for input values.

The next layer is called the hidden or middle layer 403. A hidden layer is not required but, is usually used. It includes a set of nodes as shown in FIG. 4. The outputs from nodes of the input layer 405 are used as inputs to each node in the hidden layer 403. Likewise the outputs of nodes of the hidden layer 403 are used as inputs to each node in the output layer 401. Additional hidden layers can be used. Each node in these additional hidden layers would take the outputs from the previous layer as their inputs. Any number of hidden layers can be utilized.

The output layer 401 may consist of one or more nodes. As their input values they take the output of nodes of the hidden layer 403. The output(s) of the node(s) of the output layer 401 are the forecast(s) 409 produced by the neural network using the input data 407.

Each connection between nodes in the neural network has an associated weight. Weights determine how much relative effect an input value has on the output value of the node in question. Before the network is trained, random values are selected for each of the weights. The weights are changed as the neural network is trained. The weights are changed according to the learning law associated with the neural network.

When the inputs of each node of a layer are connected to all of the outputs of the nodes in the previous layer, the network is called fully connected. If all nodes use output values from nodes of a previous layer the network is a feed forward network. Note that if any node uses output values from nodes of a later level the network is said to have feedback. The neural network shown in FIG. 4 is a fully connected feed forward neural network.

A neural network is built by specifying the number arrangement and connection of the nodes of which it is made up. In a highly structured embodiment of a neural network, the configuration is fairly simple. For example, in a fully connected network with one middle layer (and of course including one input and one output layer), and no feedback, the number of connections and consequently the number of weights is fixed by the number of nodes in each layer. Such is the case in the example shown in FIG. 4.

In a neural network that has nodes having the same activation function, we need to know the number of nodes in each layer. This determines the number of weights and hence total storage needed to build the network. The modular aspect of the present invention takes advantage of this way of simplifying the specification of a neural network. Note that more complex networks require more configuration information, and therefore more storage.

The present invention contemplates other types of neural network configurations for use with a neural network. All that is required for a neural network is that the neural network be able to be trained and retrained so as to provide the needed forecasts.

Referring now to FIG. 4, a representative embodiment of a feed forward neural network will now be described. This is only illustrative of one way in which a neural network can function. Input data 407 is provided to input storage locations called input nodes in the input layer 405. The hidden layer 403 nodes each retrieve the input values from all of the inputs in the input layer 405. Each node has a weight associated with each input value. Each node multiplies each input value times its associated weight, and sums these values for all of the inputs. This sum is then used as input to an equation (also called a transfer function or activation function) to produce an output or activation for that node. The processing for nodes in the hidden layer 403 can be performed in parallel, or they can be performed sequentially. In the neural network with only one hidden layer 403 as shown in FIG. 4, the output values or activations would then be computed. For each output node, the output values or activations from each of the hidden nodes is retrieved. Each output or activation is multiplied by its associated weight, and these values are summed. This sum is then used as input to an equation which produces as its result the output data or forecast 409. Thus using input data 407, a neural network produces a forecast or output 409 which is as a predicted value. An equivalent function can be achieved using analog means.

Nodes

Figure 8:
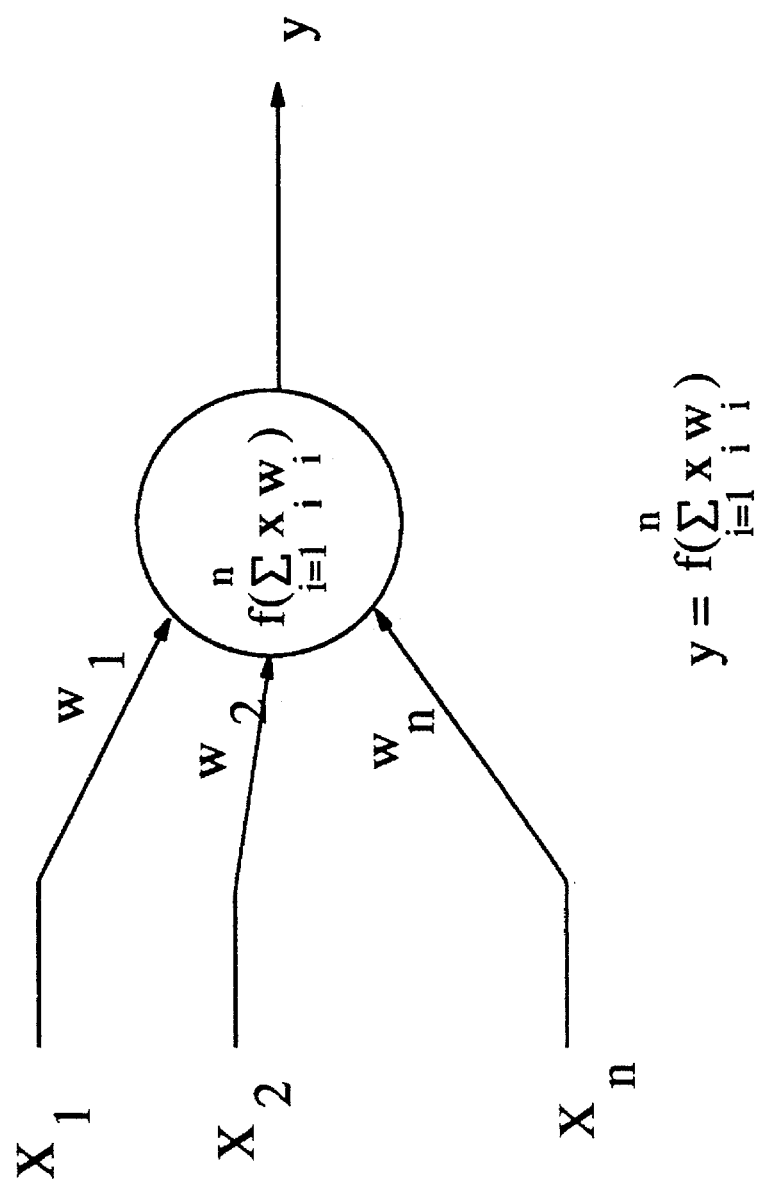
FIG. 8 depicts a embodiment of a node in a neural network.

A typical node is shown in FIG. 8. The output of the node is a nonlinear function of the weighted sum of its inputs. The input/output relationship of a node is often described as the transfer function or activation function. In most neural networks all the equations for all the nodes are the same (although the weights and inputs will differ). The activation function can be represented symbolically as follows:

$$y=f(\Sigma w_i x_i)$$

Figure 7C:
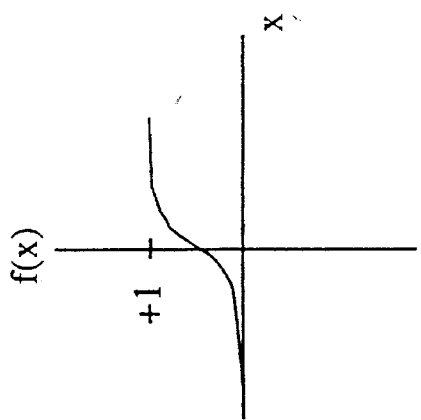
FIG. 7(c) shows a sigmoid activation function.

It is the weighted sum, $\Sigma w_i x_i$, that is inputted to the nodes activation function. The activation function determines the activity level or excitation level generated in the node as a result of an input signal of a particular size. Any function may be selected as the activation function. However, for use with back propagation a sigmoidal function is preferred. The sigmoidal function is continuous S-shaped monotically increasing function which asymptotically approaches fixed values as the input approaches plus or minus infinity. Typically the upper limit of the sigmoid is set to +1 and the lower limit is set to either 0 or −1. A sigmoidal function is shown in FIG. 7(c) and can be represented as follows:

$$f(x)=1/(1+e^{-(x+T)})$$

where x is weighted input (i.e., $\Sigma w_i x_i$) and T is a simple threshold or bias.

Figure 9:
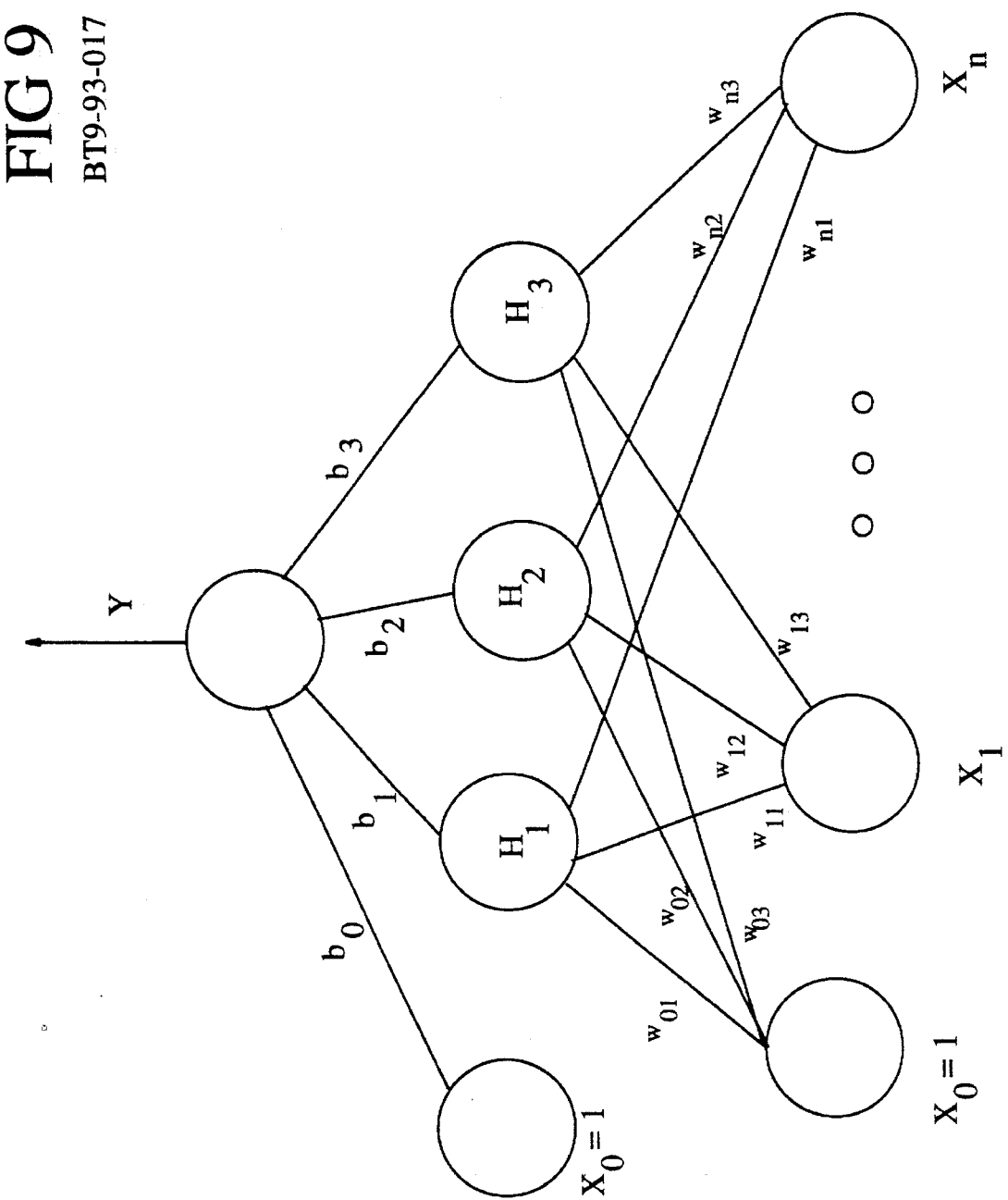
FIG. 9 shows a neural network model used to demonstrate linear regressions with nonlinear sigmoidal transformations.

Note that the threshold T in the above equation can be eliminated by including a bias node in the neural network. The bias node has no inputs and outputs a constant value (typically a +1) to all output and hidden layer nodes in the neural network. The weights that each node assigns to this one output becomes the threshold term for the given node. This simplifies the equation to $f(x)=1/(1+e^{-x})$ where x is weighted input (i.e., $\Sigma w_i x_i$ where $x_0=1$, and $w_0$ is added as a weight). FIG. 9 depicts a neural network with a bias node (i.e. $x_0=1$) as does FIG. 2 and FIG. 1.

Referring to the three layer feed-forward network in FIG. 9. This neural network has an input layer that distributes the weighted input to the hidden layer, which then transforms that input and passes it to an output layer, which performs a further transformation and produces an output (forecast). In this example, the hidden layer contains three nodes $H_1$, $H_2$, and $H_3$ as shown in FIG. 9. Each node acts as a regression equation by taking the sum of its weighted inputs as follows:

$$H_{i(IN)}=w_{0i}+w_{1i}x_1 \ldots +w_{ni}x_{bn}$$

where $(w_{0i}, \ldots, w_{ni})$ are the weights associated with each of the inputs $(x_0, \ldots, x_n)$, with $x_0=1$, for hidden node $H_i$.

Using a sigmoidal activation function for the hidden nodes, each hidden node transforms this input using a sigmoidal activation function such that:

$$H_{i(OUT)}=1/(1+e^{-Hi(IN)})$$

where $H_{i(OUT)}$ is the output of hidden node $H_i$.

The output of each hidden node is multiplied by the weight of its connection to the output node (i.e., $b_i$). The results of these multiplications are summed to provide the input to the output layer node, thus the input of the activation function of the output node is defined as $$Y_{IN}=b_0+b_1H_{1(OUT)}+b_2H_{2(OUT)}+b_3H_{3(OUT)}$$

The forecast or predicted value, Y, is obtained by a sigmoidal transformation of this input $$Y=1/(1+e^{-YIN})$$

Figure 7B:
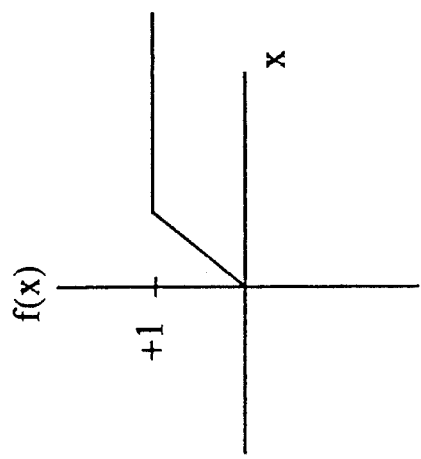
FIG. 7(b) shows a threshold logic activation function.
Figure 7A:
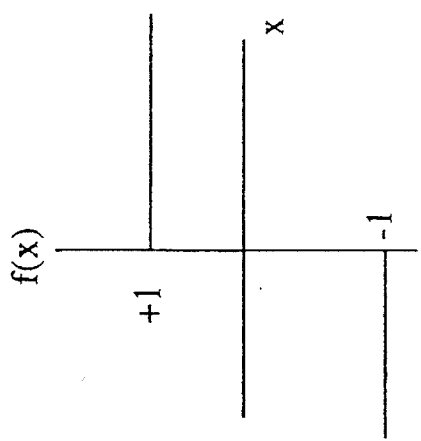
FIG. 7(a) shows a hard-limited activation function.

The actual values of the connection weights $[(w_{01}, \ldots, w_{n1}), (w_{02}, \ldots, w_{n2}), (w_{03}, \ldots, w_{n3})]$, $[b_0, b_1, b_2, b_3]$ are determined through training. See the section below that describes training of the neural network. Note that although a sigmoidal activation function is the preferred activation function, the present invention may be used with any other activation functions. FIG. 7(a) depicts a hard-limiter activation function. FIG. 7(b) depicts a threshold logic activation function. FIG. 7(c) depicts a sigmoidal activation function. Other activation functions may be utilized with the present invention as well.

Inputs

A neural network accepts input data via its input layer. In the case of the present invention this input takes the form of historical data and a statistical forecast. Historical data may be grouped by factor or variable. For instance, in a sales office planning application the historical data may contain the previous sales volume for the last 6 years. Thus, the factor or variable of previous sales volume would contain 6 individual values or items for each of the years in the historical data store. A example of historical data for the sales forecasting system is shown in TABLE II. Other factors may be the number of sales persons employed or telephone calls received or information requests received or serviced. A neural network of the present invention may use zero, one, or all of the data items associated with a particular factor.

The selection of which factors and which data items to input to the neural network is a decision for the system designer. The particular data items selected can be changed at a later time if less than desirable results are obtained. The system designer can use information obtained from the statistical model, analysis of the historical data and experience obtained during training of the neural network to select an appropriate set of factors and associated data items. The system designer may have to experiment with factors and data items to select the most appropriate set.

For convenience in analyzing neural network performance and in the creation of the training sets the historical data may be stored in a computer database. A relational or object oriented database is suitable for use with the present invention. There are many commercial available databases suitable for use with the present invention.

TABLE II

| | | FACTORS | |
| --- | --- | --- | --- |
| YEAR | SALES | SALES FORCE | REQUESTS |
| 1992 | 1200 | 12 | 5000 |
| 1991 | 1000 | 11 | 4888 |
| 1990 | 980 | 12 | 6000 |
| 1989 | 969 | 10 | 3900 |
| 1988 | 996 | 12 | 4002 |
| 1997 | 754 | 9 | 4001 |

Training

As was stated previously, each connection between nodes in the neural network has an associated weight. Weights determine how much relative effect an input value has on the output value of the node in question. Before the network is trained, random values are selected for each of the weights. The weights are changed as the neural network is trained. The weights are changed according to the learning law associated with the neural network.

The weights used in neural network are adjustable values which determine (for any given neural network configuration) the forecast for a given set of input data. Neural networks are superior to conventional statistical models for certain tasks because neural networks can adjust these weights automatically and thus they do not require that the weights be known a priori. Thus, neural networks are capable of building the structure of the relationship (or model) between the input data and the output data by adjusting the weights, whereas in a conventional statistical model the developer must define the equation(s) and the fixed constant(s) to be used in the equation.

Figure 3:
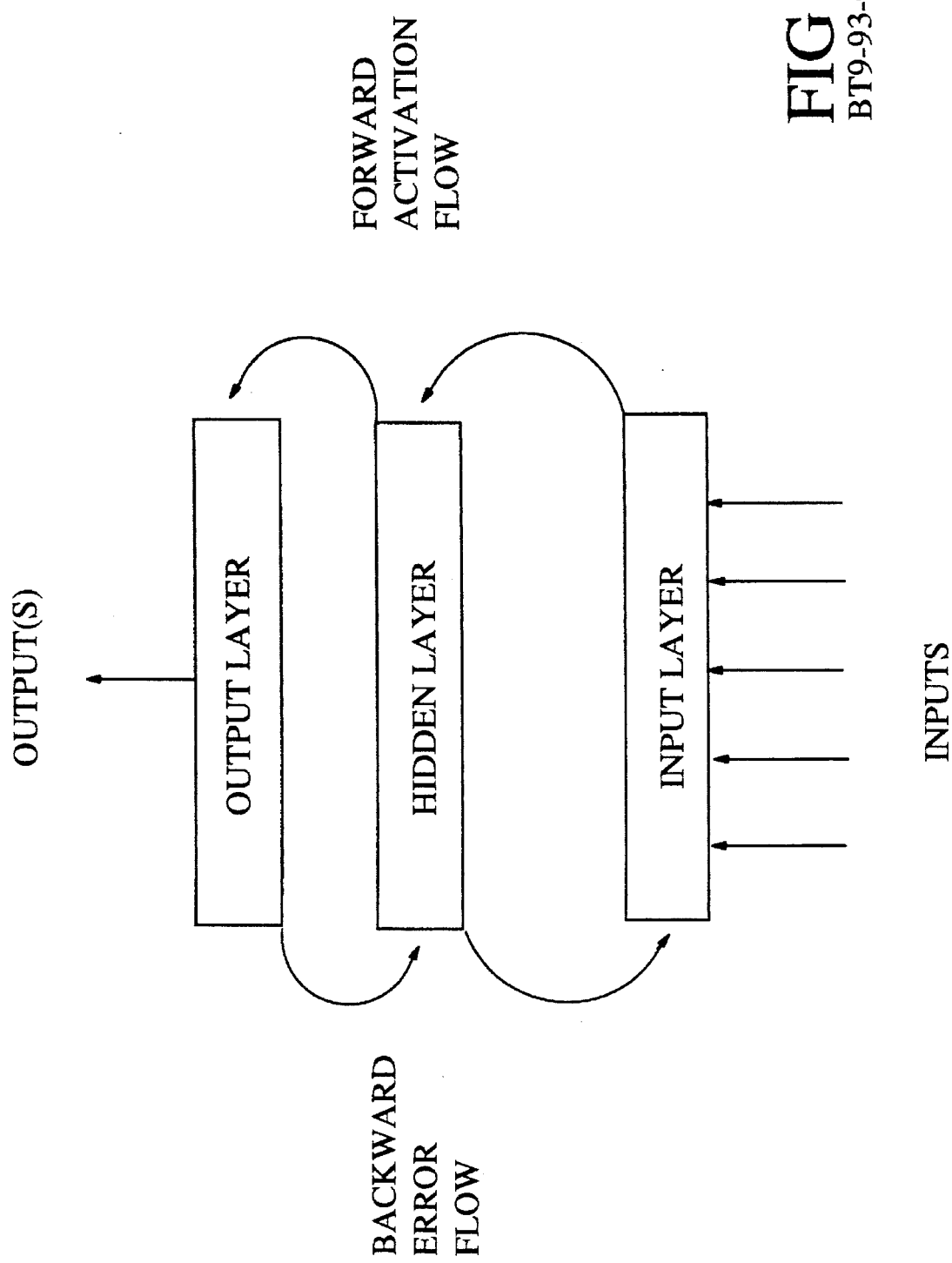
FIG. 3 shows information flow between the layers of a neural network while using back propagation for training.
Figure 6:
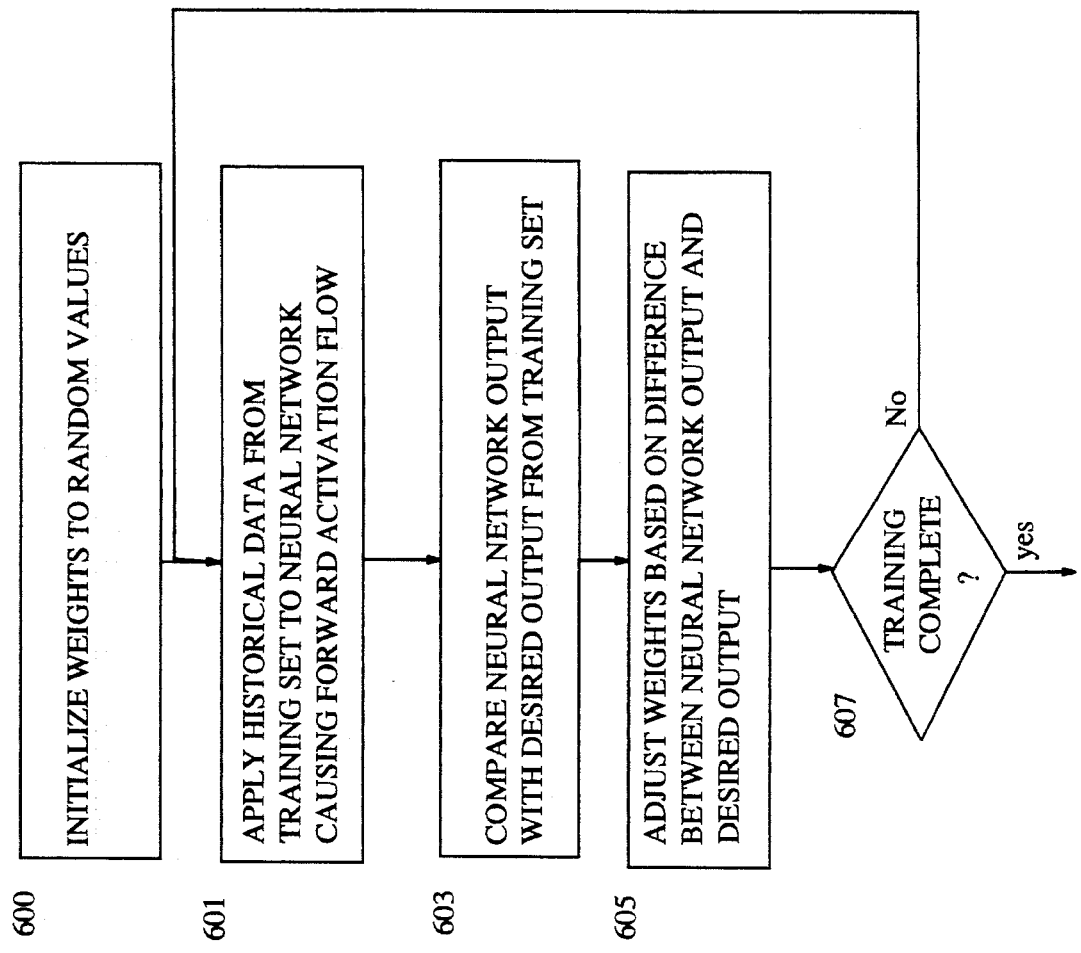
FIG. 6 shows the steps required for training the neural network.

The adjustment of weights in a neural network is commonly referred to as training or learning. Training a neural network requires that training data be assembled for use by the training means. The training means then implements the steps shown in FIG. 6 and described below. Referring now to FIG. 6, the present invention contemplates various approaches for training the neural network. In step 600 the weights are initialized to random values. When retraining the neural network step 600 may be skipped so that training begins with the weights computed for the neural network from the previous training session(s). In step 601 a set of input data is applied to the neural network. As described previously, this input causes the nodes in the input layer to generate outputs to the nodes of the hidden layer, which in turn generates outputs to the nodes of the output layer which in turn produces the forecast This flow of information from the input nodes to the output nodes is typically referred to as forward activation flow. Forward activation now is depicted on the right side of FIG. 3.

Returning now to FIG. 6, associated with the input data applied to the neural network in step 601 is a desired (actual or known or correct) output value. In step 603 the forecast produced by the neural network is compared with the desired output. The difference between the desired output and the forecast produced by the neural network is referred to as the error value. This error value is then used to adjust the weights in the neural network as depicted in step 605.

One suitable approach for adjusting weights is called back propagation (also commonly referred as the generalized delta rule). Back propagation is a supervised learning method in which an output error signal is fed back through the network, altering connection weights so as to minimize that error. Back propagation uses the error value and the learning law to determine how much to adjust the weights in the network. In effect, the error between the forecast output value and the desired output value is propagated back through the output layer and through the hidden layer(s). Back propagation distributes the overall error value to each of the nodes in the neural network, adjusting the weights associated with each node's inputs based on the error value allocated to it. The error value is thus propagated back through the neural network. This accounts for the name back propagation. This backward error flow is depicted on the left hand side of FIG. 3.

Once the error associated with a given node is known, the node's weights can be adjusted. One way of adjusting the weights for given node is as follows:

$$W_{new} = W_{old} + \beta EX$$

where E is the error signal associated with the node, X represents the inputs (i.e., as a vector), $W_{old}$ is the current weights (represented as a vector), and $W_{new}$ is the weights after adjustment, and $\beta$ is a learning constant or rate. $\beta$ can be thought of as the size of the steps taken down the error curve. Other variations of this method can be used with the present invention. For example the following $$W_{new} = W_{old} + \beta EX + \alpha(W_{new} - W_{old})_{prev}$$

includes a momentum term, $\alpha(W_{new} - W_{old})_{prev}$, where $\alpha$ is a constant that is multiplied by the change in the weight from a previous input pattern.

According to the back propagation method, which is illustrative of training methods that can be used for the neural network, an error value for each node in the hidden layer is computed by summing the errors of the output nodes each multiplied by its associated weight on the connection between the hidden node in the hidden layer and the corresponding output nodes in the output layer. This estimate of the error for each hidden layer node is then used in the manner described above to adjust the weights between the input layer and the hidden layer.

It can thus be seen that the error between the output data and the training input data is propagated back through the network to adjust the weights so that the error is reduced. This process is repeated with each of the training sets until training is complete. As shown in step 607 a test is used to determine whether training is complete or not. This test could simply check that the error value be less than a certain threshold over a certain number of previous training iterations. It could also simply end training after a certain number of iterations. A preferred technique is to use a set of testing data and measure the error generated by the testing data. The testing data could be generated so that it is mutually exclusive of the data used for training. If the error resulting from application of the testing data is less than a predetermined amount training is considered completed else training continues. Note that when test data is used to determine when training is completed the weights are not adjusted as a result of applying the testing data to the neural network. That is the test data is not used to train the network.

In summary to train the newly configured neural network the weights are usually initialized by assigning them random values, step 600. During training, the neural network uses its input data to produce predicted output data as described above in step 601. These output data values are used in combination with training input data to produce error data, step 603. The error data is the difference between the output from the output nodes and the target or actual data. These error data values are then propagated back through the network through the output node(s) and used in accordance with the activation function present in those nodes to adjust the weights, step 605. A test is used to determine if training is complete or more training is required, step 607.

More detail on training and the back propagation method in particular can be found in Parallel Distributed Processing, Explorations in the Microstructure of Cognition, by David E. Rumelhart and James L. McClelland, The MIT Press, Cambridge, Mass., USA, 1986, and Explorations In Parallel Distributed Processing, A Handbook of Models, Programs, and Exercises, by James L. McClelland and David E. Rumelhart, The MIT Press, Cambridge, Mass., 1988, which are incorporated herein by reference.

Note that although the present invention has been described with respect to the basic back propagation algorithm other variations of the back propagation algorithm may be used with the present invention as well. Other learning laws may also be used. For instance, reinforcement learning. In reinforcement learning a global reinforcement signal is applied to all nodes in the neural network. The nodes then adjust their weights based on the reinforcement signal. This is decidedly different from back propagation techniques which essentially attempts to form an error signal at the output of each neuron in the network. In reinforcement learning there is only one error signal which is used by all nodes.

Training Data

Figure 5:
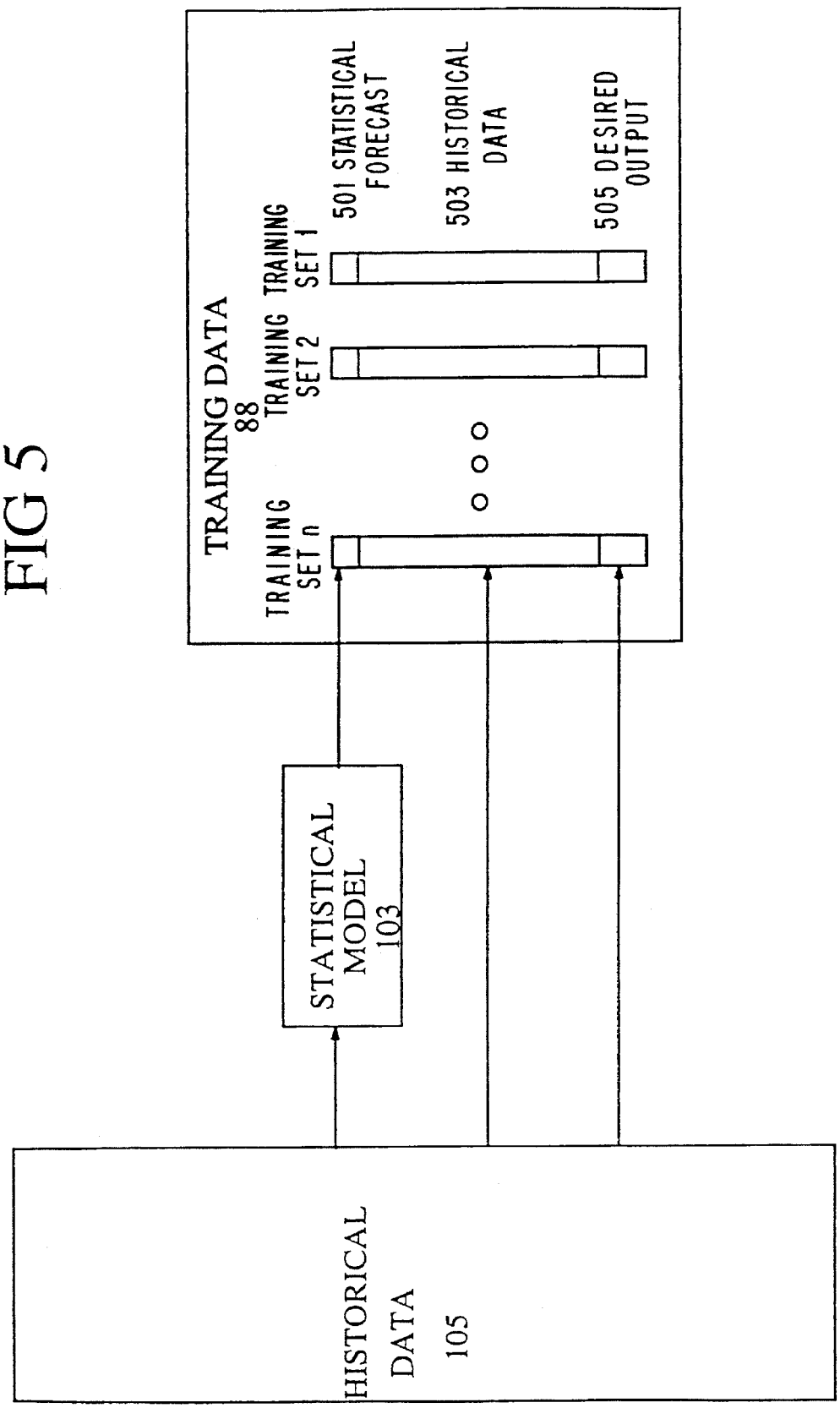
FIG. 5 depicts the relationship between training data and historical dam.

The neural network is trained by presenting it with many different training sets. Turning now to FIG. 5, each training set has a set historical data items 503 and an associated desired output data values 505 (i.e, the actual or correct or known value). As described below, the present invention can use a historical database to automatically create the desired training sets. However, the present invention in addition to using historical data also requires the use of a statistical forecast 501 with each training set. Therefore, associated with the historical data 503 in each of the training sets is a statistical forecast 501.

The statistical forecast 501 is generated from the historical data applicable to the historical data in the training set. Returning to our sales projection application and referring table II which contains historic data for one sales district. If we assume the neural network has the following six inputs: previous year sales, 2nd previous years sales, previous years sales force, 2nd previous years sales force, previous years request and the statistical forecast. For purposes of this example, we assume that the statistical model consists of taking the average of the last three previous years sales. A training set using information contained in TABLE II for year 1992 would consist of the following:

| STATISTICAL FORECAST: | 976 | (1000 + 980 + 969)/3 |
|---|---|---|
| HISTORIC DATA: | 1000 | previous year sales |
|  | 980 | 2nd pervious years sales |
|  | 11 | previous years sales force |
|  | 12 | 2nd previous years sales force |
|  | 4888 | previous years request |
| DESIRED OUTPUT | 1200 | from year 1992 |

Note that this defines only one training set. Other training sets would need to be constructed from the sale district data shown in TABLE II. For instance, using previous years (i.e., 1991, 1990, etc . . . ). Sales data from other sales districts could be utilized as well. Note that because the statistical model and the neural network may use different factors the statistical forecast may not necessarily use historical data contained in the training set to generate the statistical forecast associated with the training set. This was demonstrated in the example above. In fact the neural network and the statistical model may use the same factors but different items within a factor. A training set thus contains the following:

1) historical data or data items;
2) A statistical forecast;
3) A desired forecast;

The training sets are then used to adjust the weights in the neural network as described above. Any given training set may be utilized multiple times in a training session. After the neural network is trained operational data is applied to the trained neural network to generate the forecast. Operational data consists of historical data and a statistical forecast. Thus, using the sales example above the operational data for generating a sales forecast for the district represented by TABLE II for 1993 is as follows:

| STATISTICAL FORECAST: | 1060 | (1200 + 1000 + 980)/3 |
|---|---|---|
| HISTORIC DATA: | 1200 | previous year sales |
|  | 1000 | 2nd pervious years sales |
|  | 12 | previous years sales force |
|  | 11 | 2nd previous years sales force |
|  | 5000 | previous years request. |

The output generated from the trained neural network with this set of operational inputs is the forecast value for sales in the sales district represented by TABLE II for 1993.

For ease of analysis and creation the training data can be stored in a database with the historical data. Test data having the same structure as the training data may also be stored in the data base. Note that the statistical forecast required for training data and testing data may be precomputed and stored in the data base or can be computed as necessary during training or testing.

Statistical Model

The statistical model provides a statistical forecast to the neural network for the training, operational, and retraining modes of operation. The statistical model is a software system comprised of the functions necessary to implement a statistical model that generates a forecast. The statistical model does not have to be located in the same computer system or computer systems(s) as the neural network. The statistical forecast may be calculated on another system and the statistical forecast input by a user into the historical data store or directly input to the neural network. The use of statistical forecasting is well known in the art. Most organizations already have such models that they currently use to support planning functions. These already built statistical models can be used with the present invention.

The statistical model may be as simple as a one line equation or may a complex model with many variables. For purposes of explaining the present invention a regression technique is described. Regression is a typical means of statistically generating a forecast from a set of historical data. It should however be noted that the present invention is in no way limited to statistical regression techniques and will work with other statistical techniques such as time-series regression and discriminant analysis. With this in mind a brief description of a regression analysis is provided.

A linear regression model consists of estimating parameters $(a_0, \ldots, a_n)$ in the equation $$Y = a_0 + a_1 x_1 + \ldots + a_n x_n$$

where $(x_1, \ldots, x_n)$ is an observed (input) vector and Y is the predicted value. Various techniques are used to determine the estimating parameters $(a_0, \ldots, a_n)$ from the historical data. Once these estimating parameters have been determined a forecast can be determined for a given set of input data.

Many statistical techniques are available for generating a statistical forecast. Although a regression technique was described above other types of techniques as well as other types of regression techniques may be utilized by the present invention. For instance the present invention can be utilized with stepwise autoregression and exponential smoothing. These techniques may also be combined with detrending techniques such as simple growth, fast differences and residuals from a linear time trend regression. References for regression and other statistical forecasting techniques can be found in the following references hereby incorporated by reference: D. C. Montgomery, L. A. Johnson and J. S. Gardiner, "Forecasting and Time Series Analysis" 2nd ed., McGraw-Hill, 1990. ISBN 0-07-042858-1; R. G. Miller, Jr., "Beyond ANOVA", John Wiley, 1986. ISBN 0-471-81922-0; G. W. Snedecor and W. G. Cochran, "Statistical Methods", 8th ed., Ames, IA: Iowa St. Univ. Press, 1989.

It should be noted that many commercial available software packages provide support for statistical modelling. Many electronic spreadsheets also provide support for statistical modeling. Software such as LOTUS 123, Mircosoft Excel, Statistical Analysis System, or SAS are commercially available software packages and can easily be modified to produce the statistical model required by the present invention. The statistical output can also be created by a custom application written solely to provide input to the neural network. The statistical output may even be computed by hand with or without a hand calculator and input to the neural network by a user or operator. It should also be noted that hand calculator can also provide support for statistical modeling. Many other standard texts and software packages are also commercially available.

In addition to the statistical forecast provided by the statistical models, some of the more sophisticated statistical models provide a confidence, significance, error or residual value. This value may also be utilized by the neural network as an additional input. This input would also be added to each of the training sets so that the neural network could be trained with both the statistical forecast and the statistical error value.

Preprocessing

The preprocessing function 107 is depicted in FIG. 1. Preprocessing of the input values may be performed as the inputs are being applied to the neural network or the inputs may be preprocessed and stored as preprocessed values in the historical data store. If preprocessing is performed it may consist of one or more steps. For instance, with a cascade correlation and classical back propagation has been found to work best when the input data is normalized either in the range [−1,1] or [0,1]. Note that normalization is performed for each factor of data. For example, each of the factors in Table II (i.e., sales, sales force and requests) would be separately normalized. The normalization step may also be combined with other steps such as taking the natural log of the input. Thus preprocessing may consist of taking the natural log of each input and normalizing the input over some interval. The logarithmic scale compacts large data values more than smaller values. When the neural net contains nodes with a sigmoidal activation function better results are achieved if the data is normalized over the interval [0.2,0.8]. Normalizing to range [0.2,0.8] uses the heart of the sigmoidal activation function. Other functions may be utilized to preprocess the input values.

SPECIFIC EXAMPLES AND EMBODIMENTS

Discussed above has been the preferred method of operation of the present invention. Discussed in this Section are the preferred structures (architecture) of the present invention. However, it should be understood that in the description set forth above, the modular structure (architecture) of the present invention was also discussed in connection with the operation. Thus, certain portions of the structure of the present invention have inherently been described in connection with the description set forth above.

The preferred embodiment of the present invention comprises one or more software systems. In this context, software system is a collection of one or more executable software programs, and one or more storage areas, for example, RAM or disk. In general terms, a software system should be understood to comprise a fully functional software embodiment of a function, which can be added to an existing computer system to provide new function to that computer system.

Software systems generally are constructed in a layered fashion. In a layered system, a lowest level software system is usually the computer operating system which enables the hardware to execute software instructions. Additional layers of software systems may provide, for example, database capability. This database system provides a foundation layer on which additional software systems can be built. For example, a neural network software system can be layered on top of the database. Also, a forecasting software system can be layered on top of the historical database system.

A software system is thus understood to be a software implementation of a function which can be assembled in a layered fashion to produce a computer system providing new functionality. Also, in general, the interface provided by one software system to another software system is well-defined. It should be understood in the context of the present invention that delineations between software systems are representative of the preferred implementation. However, the present invention may be implemented using any combination or separation of software systems.

The database can be implemented as a stand-alone software system which forms a foundation layer on which other software systems, (e.g., such as the neural network, statistical model, and training means) can be layered. Such a foundation layer database system can support many functions in a forecasting environment. For example, the database can serve as a foundation for software which provides graphical displays of historical data, training data, and testing data for use by a the system designer. A database can also provide data to data analysis and display software which can be used for analyzing the operation of the neural network. Such a foundation layer database system will often contain a large number of historical data, training data sets, statistical forecast, a testing data sets, error data and results.

The database, as used in the present invention, can be implemented using a number of methods. For example, the database can be built as a random access memory (RAM) database. The historical database can also be implemented as a disk-based database, or as a combination of RAM and disk databases. The present invention contemplates any computer or analog means of performing the functions of the database. These include the use of flat files, relational data bases, object oriented databases or hierarchical data bases to name a few.

The neural network retrieves input data and uses this retrieved input data to output a forecast. The output data (i.e., the forecast) can be supplied to the database for storage or can be sent to other software systems such as decision making or planning applications or it can be shown on a display. The input data can be obtained from the database.

It should be understood that neural networks, as used in the present invention, can be implemented in any way. For example, the preferred embodiment uses a software implementation of a neural network. It should be understood, however, that any form of implementing a neural network can be used in the present invention, including physical analog forms. Specifically, as described below, the neural network may be implemented as a software module in a computer system. Furthermore, the neural network of the present invention may implemented on one computer system during training and retraining and another during operational mode. Thus a neural computer, using parallel processing, could be utilized during the computationally intensive training stage and then once the weights have been adapted the weights and the neural network could be embodied in a PC or PDA or workstation to generate the required forecast using the required operational input data.

It should also be understood with regard to the present invention that software and computer embodiments are only one possible way of implementing the various elements in the systems and methods. As mentioned above, the neural network may be implemented in analog or digital form. It should be understood, with respect to the method steps as described above for the functioning of the systems as described in this section, that operations such as computing or determining (which imply the operation of a digital computer) may also be carried out in analog equivalents or by other methods.

The neural network, statistical model, training means and database may, in a variant of the present invention, be implemented as a single software system. This single software system could be delivered to a computer installation in which no historical database previously existed, to provide the functions of the present invention. Alternately, a neural network configuration function (or program) could also be included in this software system. A neural network configuration module can be connected in a bi-directional path configuration with the neural network. The neural network configuration module is used by the user (developer) to configure and control the neural network in a fashion as discussed above in connection with the step and module or in connection with the user interface discussion contained below.

The neural network must contain a neural network model. As stated above, the present invention contemplates all presently available and future developed neural network models and architectures. The neural network model can have a fully connected aspect, or a no feedback aspect. These are just examples. Other aspects or architectures for the neural network model are contemplated.

The neural network must have access to input data and training data and access to locations in which it can store output data and error data. One embodiment of the present invention uses an approach where the data is not kept in the neural network. Instead, data pointers are kept in the neural network which point to data storage locations (e.g., a working memory area) in a separate software system. These data pointers, also called data specifications, can take a number of forms and can be used to point to data used for a number of purposes. For example, input data pointer and output data pointer must be specified. The pointer can point to or use a particular data source system for the data, a data type, and a data item pointer. Neural network must also have a data retrieval function and a data storage function. Examples of these functions are callable routines, disk access, and network access. These are merely examples of the aspects of retrieval and storage functions. The preferred method is to have the neural network utilize data in the database. The neural network itself can retrieve data from the database or another module could feed data to the areas specified by the neural networks pointers.

The neural network also needs to be trained, as discussed above. As stated previously, any presently available or future developed training method is contemplated by the present invention. The training method also may be somewhat dictated by the architecture of the neural network model that is used. Examples of aspects of training methods include back propagation, generalized delta, and gradient descent, all of which are well known in the art.

The neural network needs to know the data type that is being specified. This is particularly important in an historical database since it can provide more than one type of data. Finally, the data item pointer must be specified. It is thus seen that neural network can be constructed so as to obtain desired input data or to provide output data in any intended fashion. In the preferred embodiment of the present invention, this is all done through menu selection by the user (developer) using a software based system on a computer platform. The present invention can utilize a template and menu driven user interface, which allows the user to configure, reconfigure and operate the present invention. This approach makes the present invention very user friendly. It also eliminates the need for the user to perform any computer programming, since the configuration, reconfiguration and operation of the present invention is carried out in a template and menu format not requiring any actual computer programming expertise or knowledge. There are several aids for the development of neural networks commonly available. For example, the IBM Neural Network Utility (NNU) provides access to a number of neural paradigms (including back propagation) using a graphical user interface (GUI) as well as an application programmer's interface (API) which allows the network to be embedded in a larger system. The NNU GUI runs on Intel-based machines using OS/2 or DOS/Windows and on RISC/6000 machines using AIX. The API is available not only on those platforms but also on a number of mainframe platforms, including VM/CMS and OS/400. Available hardware for improving neural network training and run-time performance includes the IBM Wizard, a card that plugs into MicroChannel buses. Other vendors with similar software and/or hardware products include NeuralWare, Nestor and Hecht-Nielsen Co.

Figure 10:
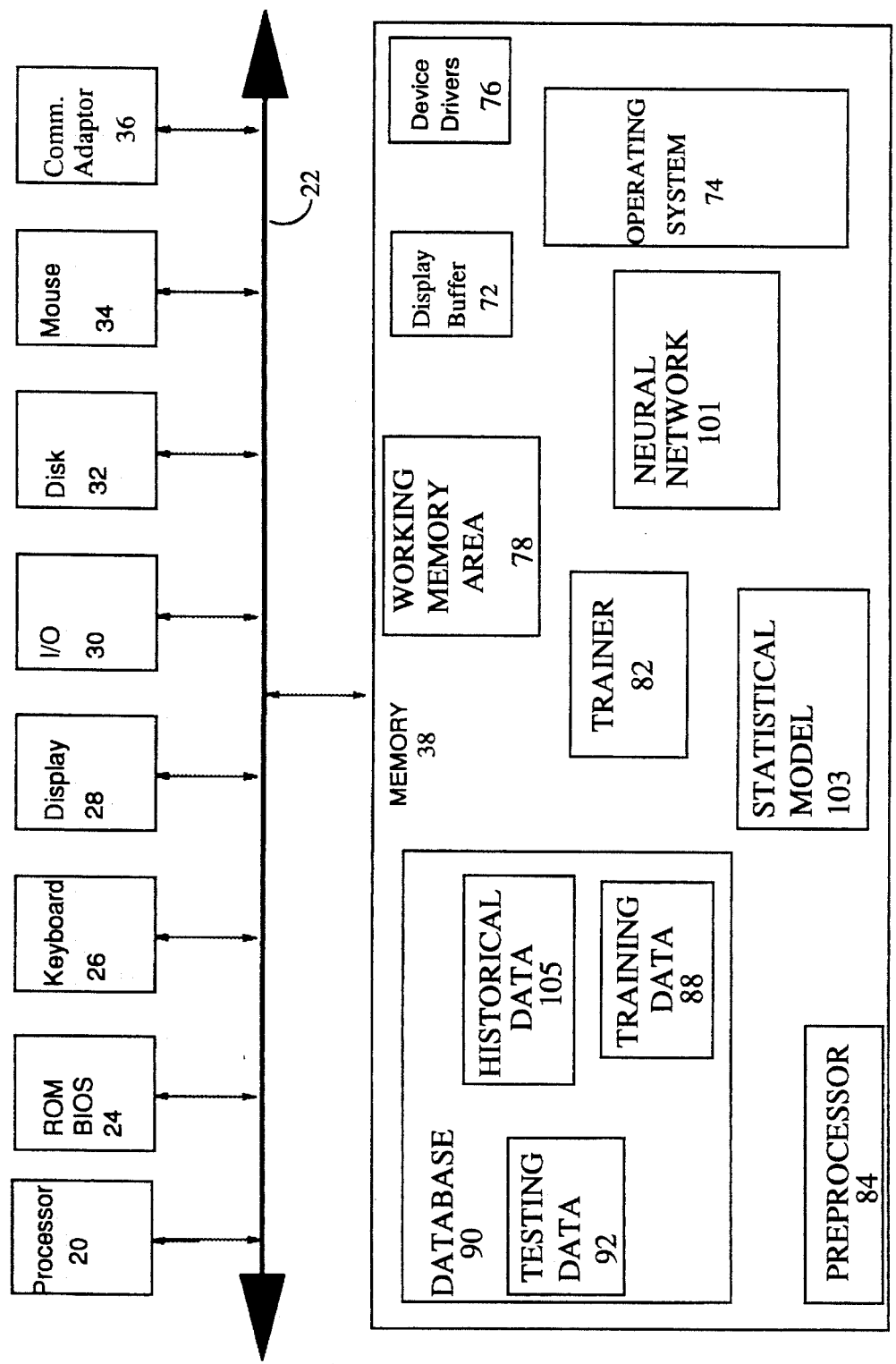
FIG. 10 shows one embodiment of the present invention.

The preferred embodiment of this invention comprises a set of software systems for combining statistical forecasts with a neural network as shown in the architectural block diagram of FIG. 1. FIG. 10 shows one embodiment of the present invention and includes a processor 20 connected by means of a system bus 22 to a read only memory (ROM) 24 and memory 38. Also included in the computer system in FIG. 10 are a display 28 by which the computer presents information to the user, and a plurality of input devices including a keyboard 26, mouse 34 and other devices that may be attached via input/output port 30. Other input devices such as other pointing devices or a voice sensors or image sensors may also be attached. Other pointing devices include tablets, numeric keypads, touch screen, touch screen overlays, track balls, joy sticks, light pens, thumb wheels etc. The I/O 30 can be connected to communications lines, disk storage, input devices, output devices or other I/O equipment. The memory 38 includes a display buffer 72 that contains pixel intensity values for a display screen. The display 28 periodically reads the pixel values from the display buffer 72 displaying these values onto a display screen. The pixel intensity values may represent grey-levels or colors.

The memory 38 includes a database 90, trainer 82, statistical model 103, neural network 101, preprocessor 84. The database 90 as shown contains historical data 105, training data, testing data 92. The database may also include results from operational, training or retaining modes of using the neural network. These elements have been described in detail above.

Also showm in memory 38 is the operating system 74. Examples of operating systems include AIX, OS/2, and DOS. Other elements shown in memory 38 include driven 76 which interpret the electrical signals generated by devices such as the keyboard and mouse. A working memory area 78 is also shown in memory 38. The working memory area 78 can be utilized by any of the elements shown in memory 38. The working memory area can be utilized by the neural network 101, statistical model 103, trainer 82, the operating system 74 and other functions. The working memory area 78 may be partitioned amongst the elements and within an element. The working memory area 78 may be utilized for communication, buffering, temporary storage, or storage of data while a program is running.

IRS Return Volume Example

The present invention will now be demonstrated by way of an example. The United States Internal Revenue Service (IRS) plans the level of customer service at each geographical district office as many as five years in advance. The IRS provides services such as answering taxpayer questions, disseminating tax forms and providing publications and instructions for IRS representatives. To provide quality service, the IRS plans the utilization of resources. These resources include office space, conference areas, telephones, computers, personnel or other resources. Analysis of historical data shows that these services directly relate to the number of forms returned by taxpayers. For example, the level of service required for Form 1040 in a district office is related to the number of forms returned by the geographical region it serves. This relationship between service and return volume implies that the ability to forecast the volume of returns for specific forms can improve the accuracy of planning for services to be provided. In order to achieve the proper resource allocation it is essential to produce improved forecasts.

Statistical methods applied to forecast tax return volume provide estimates of the level of service required regionally. Several factors affect these statistical forecasts. Standard statistical methods use the main contributing factors and tend to ignore apparently peripheral factors and data. For this reason, standard statistical methods do not use factors that potentially could improve these predictions. In addition to the random variables that can affect the forecasts, there are legislative changes which can devalue the trends set in historical data and thus diminish the accuracy of longer-range forecasts.

The set of inputs that were found to provide the best generalization and accuracy consisted of 3 lag years of number of returns and 4 lag years of population and employment. This data has been accumulated on a district basis (the IRS divides the U.S. into 63 districts). The neural network was trained with the number of returns in each district for 1989. We then used that information to forecast the number of returns for each district in 1990.

The set of inputs to the neural network were preprocessed. The best technique found for normalizing the inputs was to take the natural log of the input and then normalize it to a value between 0.2 and 0.8. In this way, it was assured that the "heart" of the sigmoidal function would be utilized. This ameliorated the problems implicit in values that lie on the edges of the function, near 0 and 1. The IRS supplied input data had a large range and the measurements were in percentage terms. If the data was simply normalized between 0.2 and 0.8, the percentage error would tend to be much larger in the smaller districts. The error, on average, is approximately equal for all inputs; however, an equal error on a smaller district will cause a larger percentage error than in a larger district. To minimize this effect, the data was normalization. The natural log of the data is taken first, which collapses the data and produces a more normal distribution. We then normalize these natural logs and present them to the network.

Figure 2:
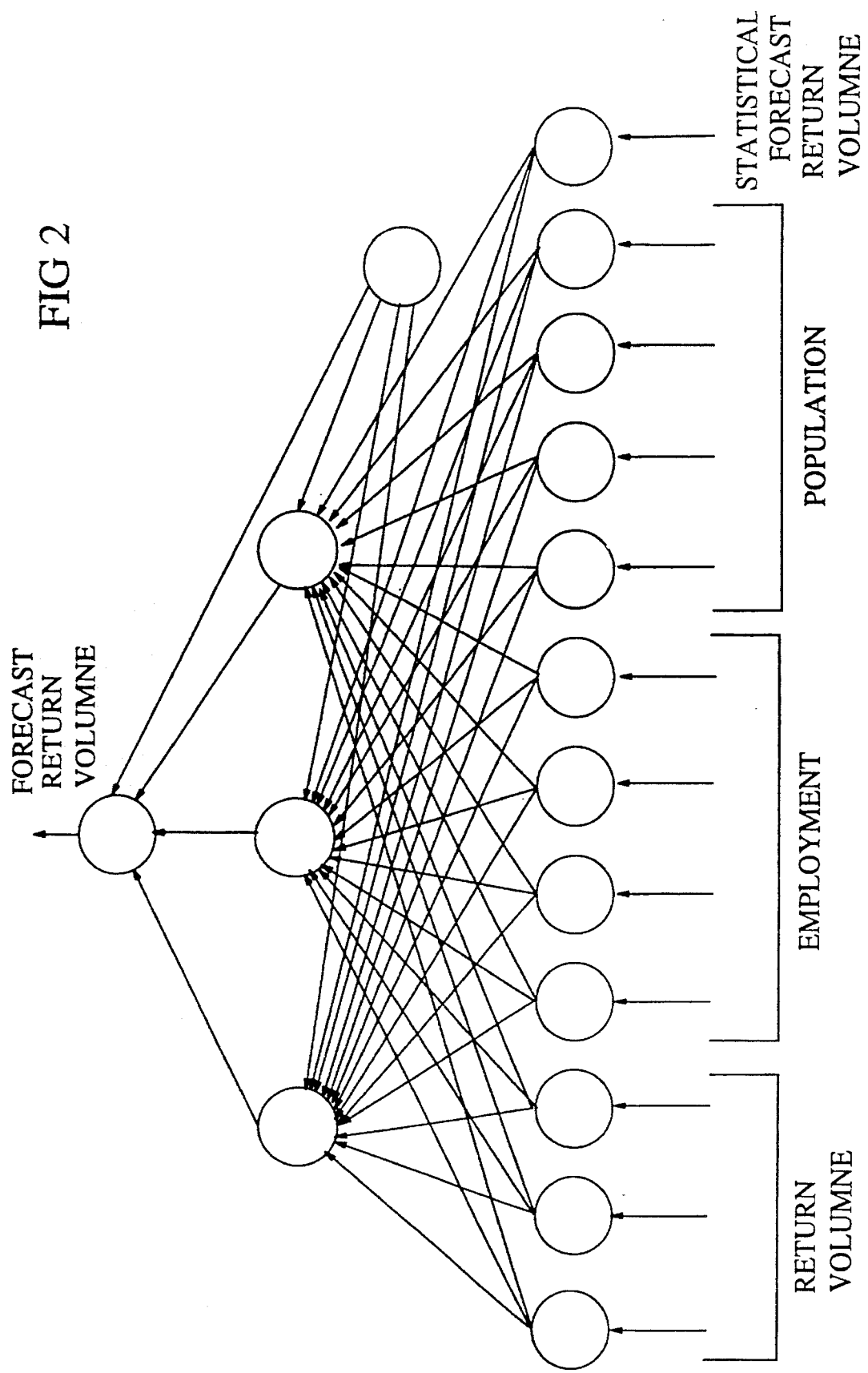
FIG. 2 shows one embodiment of a neural network used by the present invention.

A feed-forward network using the standard back propagation algorithm, as presented in Rumelhart, performs the forecasting. There are 12 input nodes, one output (the forecast) and three hidden nodes. FIG. 2 depicts the neural network used to forecast IRS return volume for a given district. Experiments with more hidden nodes as well as other kinds of input data produced less accurate and general results.

A modification of the training method described previously was utilized to train the neural network. The neural network was first trained without any statistical input using only the eleven inputs: 3rd year lag—number of returns, 2nd year lag—number of returns, 1 year lag—number of returns, 4 year lag—employment, 3 year lag—employment, 2 year lag—employment, 1 year lag—employment, 4 year lag—population, 3 year lag—population, 2 year lag—population, 1 year lag—population. After training the network in this way, another input node was added which represented the forecast of the IRS statistical methods described above. The network underwent further training, using a very small $\beta$ (0.001) on the inputs which produced the initial network and a larger $\beta$ (0.1) on the statistical forecast input and the connections between the hidden and output layers. This produced improved results over the 11 input neural net described above. The weights obtained for the connections are given in Table III and Table IV.

The primary factor in determining the number of returns forecast by the neural network was simply how many returns came in the previous year. All other factors made adjustments to that term. Not surprisingly, the larger the number of returns in the previous year, the larger the number of returns in the current year.

TABLE III

| INPUT NODE | HISTORICAL DATA DESCRIPTION | HIDDEN NODE 1 | HIDDEN NODE 2 | HIDDEN NODE 3 |
|---|---|---|---|---|
| 1 | 3rd year lag, number of returns | −0.339934 | 1.363233 | 0.458574 |
| 2 | 2nd year lag, number of returns | 1.871344 | −0.115708 | 0.710115 |
| 3 | 1 year lag, number of returns | 4.502888 | −2.761811 | 2.043260 |
| 4 | 4 year lag, employment | −1.447762 | 0.747390 | −0.524117 |
| 5 | 3 year lag, employment | −0.303540 | −0.136173 | 0.275992 |
| 6 | 2 year lag, employment | 0.009690 | −0.320095 | 0.757782 |
| 7 | 1 year lag, employment | 0.308917 | −0.054794 | 0.085570 |
| 8 | 4 year lag, population | 0.340072 | −0.341799 | 0.476505 |
| 9 | 3 yur lag, population | −0.273639 | −0.039414 | 0.224522 |
| 10 | 2 year lag, population | −0.203857 | 0.114167 | −0.208017 |
| 11 | 1 year lag, population | 0.200188 | 0.362069 | −0.312378 |
| 12 | Statistical forecast, number of returns | −0.067588 | 0.120803 | 0.140663 |
| Bias | | 0.590576 | 1.297105 | −3.612483 |

Looking at the weights in conjunction with the inputs we can see that the neural network is capable of detecting trends. For instance, the number of returns two years preceding the forecasted year provides an added increase to the forecast output. However, the number of returns three years before the forecast diminishes the size of the forecast; if there is a strong decrease in returns from lag year 3 to lag year 1, there will be a smaller output. The network is detecting a trend under which a falling number of returns over the years correlates with a lowered forecast.

TABLE IV

| HIDDEN NODES | OUTPUT NODE |
|---|---|
| 1 | 4.592470 |
| 2 | −4.995990 |
| 3 | 3.736517 |
| BIAS | −1.619001 |

The network makes additional adjustments upward in the forecast for clear surges in employment; indeed, if employment doesn't increase much, the employment inputs will decrease the forecast. Oddly, though, an increase in population over time tends to decrease the forecast. The statistical forecast made a small contribution. Its weights did not seem to track any of the lag years for number of returns; in fact, they slightly counterbalanced the one year lag weights for the fast two hidden nodes.

The neural network of the present invention offers better forecasts than conventional statistical techniques and neural networks alone. Combining neural networks with the traditional statistical methods provides better results. This hybrid model can use the advantages of both methods—statistical results are easier to explain and analyze, while neural networks consider a wider range of variables and their nonlinear relationships.

ALTERNATIVES AND CLOSING

While the present invention has been described using a sales prediction and IRS return volume applications as examples, the present invention is not limited to these particular applications. The present invention may be utilized in any number of fields including but not limited to: weather forecasting, financial forecasting, sales forecasting, human resource forecasting, computer resource utilization, logistics, and natural resource utilization.

While the invention has been described in detail herein in accord with certain preferred embodiments thereof, modifications and changes therein may be effected by those skilled in the art. Accordingly, it is intended by the appended claims to cover all such modifications and changes as fall within the true spirit and scope of the invention.

What is claimed:

1. A forecasting system comprising:

a statistical model means for producing a statistical forecast from a set of historical data;

a neural network comprising an input layer, a hidden layer, and an output layer, each layer comprising one or more nodes, a first node in the input layer being connected to the statistical forecast, and all other nodes in the input layer being connected to a different historical datum from the set of historical data, each node in the input layer being connected to each node in the hidden layer and each node in the hidden layer being connected to each node in the output layer, the output layer outputting a forecast, each connection between nodes having an associated weight; and a training means for determining the weight for each said connection between nodes of the neural network, the neural network being responsive to the statistical forecast generated from the statistical model means and the set of historical data for outputting the forecast.

2. The system of claim 1 wherein the training means comprises:

means for applying a plurality of training sets to the neural network, each training set consisting of historical data, an associated statistical forecast and a desired forecast, means for determining for each set of training data a difference between the forecast produced by the neural network and the desired forecast, and means for adjusting each weight of the neural network based on the difference.

3. The system in claim 2 wherein the training means comprises means for adjusting each weight by use of back propagation.

4. The system in claim 3 wherein the training means further comprises means for applying a test data set to the neural network to determine whether training is complete.

5. The system in claim 4 wherein the test data set is not a training set.

6. The system in claim 1 and further comprising pre-processing means for computing a logarithmic value for each historical datum and for connecting each logarithmic value to the input layer.

7. The system in claim 6 wherein the pre-processing means computes a natural logarithmic value of each historical datum.

8. The system in claim 1 wherein the neural network includes a bias node that has connections to all nodes in the hidden layer and all nodes in the output layer.

9. The system in claim 1 wherein the statistical model means uses a regression technique to generate the statistical forecast.

* * * * *